United States Patent
Loretz et al.

(10) Patent No.: US 10,109,879 B2
(45) Date of Patent: Oct. 23, 2018

(54) FLOW BATTERIES HAVING AN ELECTRODE WITH A DENSITY GRADIENT AND METHODS FOR PRODUCTION AND USE THEREOF

(71) Applicant: LOCKHEED MARTIN ADVANCED ENERGY STORAGE, LLC, Bethesda, MD (US)

(72) Inventors: Jeremy Loretz, Cambridge, MA (US); Srivatsava Venkataranga Puranam, Cambridge, MA (US); Helen Elizabeth Vanbenschoten, Wakefield, MA (US)

(73) Assignee: Lockheed Martin Energy, LLC, Bethesda, MD (US)

( * ) Notice: Subject to any disclaimer, the term of this patent is extended or adjusted under 35 U.S.C. 154(b) by 0 days.

(21) Appl. No.: 15/167,926

(22) Filed: May 27, 2016

(65) Prior Publication Data

US 2017/0346123 A1 Nov. 30, 2017

(51) Int. Cl.
*H01M 8/18* (2006.01)
*H01M 4/86* (2006.01)
(Continued)

(52) U.S. Cl.
CPC ........... *H01M 8/188* (2013.01); *H01M 4/861* (2013.01); *H01M 4/8636* (2013.01);
(Continued)

(58) Field of Classification Search
CPC ...... H01M 8/188; H01M 4/8673; H01M 4/96; H01M 8/0258; H01M 8/20
See application file for complete search history.

(56) References Cited

U.S. PATENT DOCUMENTS 3,779,813 A 12/1973 Rabut
4,075,401 A 2/1978 Miyagawa
(Continued)

FOREIGN PATENT DOCUMENTS

CN 103187551 A 7/2013
DE 10-2011-120802 A1 6/2013
(Continued)

OTHER PUBLICATIONS

Soloveichik, "Flow Batteries: Current Status and Trends," 2015, Chem. Rev., 115 (20), pp. 11533-11558.
(Continued)

*Primary Examiner* — Wojciech Haske
(74) *Attorney, Agent, or Firm* — McDermott Will & Emery LLP

(57) ABSTRACT

Electrochemical cells, such as those present within flow batteries, can have at least one electrode with a density gradient in which the density increases outwardly from a separator. Such electrodes can decrease contact resistance and lessen the incidence of parasitic reactions in the electrochemical cell. Flow batteries containing the electrochemical cells can include: a first half-cell containing a first electrode, a second half-cell containing a second electrode, and a separator disposed between the first half-cell and the second half-cell. At least one of the first electrode and the second electrode has a density gradient such that a density of at least one of the first electrode and the second electrode increases outwardly from the separator.

29 Claims, 4 Drawing Sheets

(51) Int. Cl.
*H01M 4/96* (2006.01)
*H01M 8/0258* (2016.01)
*H01M 8/20* (2006.01)

(52) U.S. Cl.
CPC .......... *H01M 4/8673* (2013.01); *H01M 4/96* (2013.01); *H01M 8/0258* (2013.01); *H01M 8/20* (2013.01); *Y02E 60/528* (2013.01); *Y02P 70/56* (2015.11)

(56) References Cited

U.S. PATENT DOCUMENTS

| | | | |
|---|---|---|---|
| 4,532,193 | A | 7/1985 | Kniazzeh et al. |
| 4,735,872 | A | 4/1988 | Maimoni |
| 4,902,589 | A | 2/1990 | Dahn et al. |
| 4,948,681 | A | 8/1990 | Zagrodnik et al. |
| 5,188,911 | A | 2/1993 | Downing et al. |
| 5,618,641 | A | 4/1997 | Arias |
| 5,637,416 | A | 6/1997 | Yoshii et al. |
| 5,665,212 | A | 9/1997 | Zhong et al. |
| 6,296,746 | B1 | 10/2001 | Broman et al. |
| 7,229,564 | B2 | 6/2007 | Liu et al. |
| 8,268,475 | B2 | 9/2012 | Tucholski |
| 8,268,511 | B2 | 9/2012 | Mekala et al. |
| 9,443,782 | B1 | 9/2016 | Steimle et al. |
| 2003/0087141 | A1 | 5/2003 | Sun et al. |
| 2003/0087156 | A1 | 5/2003 | Broman et al. |
| 2003/0099884 | A1* | 5/2003 | Chiang .............. G02F 1/1523 429/233 |
| 2004/0131916 | A1 | 7/2004 | Hodge et al. |
| 2004/0191623 | A1 | 9/2004 | Kubata et al. |
| 2004/0224190 | A1 | 11/2004 | Sasahara et al. |
| 2004/0233616 | A1 | 11/2004 | Arai et al. |
| 2005/0098435 | A1 | 5/2005 | Jacobson et al. |
| 2005/0158615 | A1 | 7/2005 | Samuel et al. |
| 2005/0260473 | A1 | 11/2005 | Wang |
| 2006/0068265 | A1 | 3/2006 | Hanlon et al. |
| 2007/0037037 | A1 | 2/2007 | Nguyen et al. |
| 2007/0054175 | A1 | 3/2007 | Maendle et al. |
| 2007/0125493 | A1 | 6/2007 | Jang et al. |
| 2007/0227654 | A1 | 10/2007 | Liu et al. |
| 2007/0287047 | A1 | 12/2007 | Kaiser et al. |
| 2008/0038622 | A1 | 2/2008 | Valensa et al. |
| 2008/0142152 | A1 | 6/2008 | Debe et al. |
| 2008/0152839 | A1 | 6/2008 | Han et al. |
| 2008/0291027 | A1 | 11/2008 | Lake |
| 2008/0305385 | A1 | 12/2008 | Smiljanich et al. |
| 2008/0318110 | A1 | 12/2008 | Budinski et al. |
| 2010/0003545 | A1 | 1/2010 | Horne et al. |
| 2010/0047650 | A1 | 2/2010 | Iino et al. |
| 2010/0291442 | A1* | 11/2010 | Wang .............. H01M 4/0404 429/231.95 |
| 2011/0223450 | A1 | 9/2011 | Horne et al. |
| 2011/0244277 | A1 | 10/2011 | Gordon, II et al. |
| 2012/0040254 | A1 | 2/2012 | Amendola et al. |
| 2012/0258345 | A1* | 10/2012 | Zaffou .............. H01M 4/8605 429/105 |
| 2013/0037760 | A1 | 2/2013 | Maeda et al. |
| 2013/0071714 | A1 | 3/2013 | Perry et al. |
| 2013/0095361 | A1 | 4/2013 | Sinsabaugh et al. |
| 2013/0157097 | A1 | 6/2013 | Kampanatsanyakorn et al. |
| 2013/0266829 | A1 | 10/2013 | Cole et al. |
| 2014/0051007 | A1 | 2/2014 | Blanchet et al. |
| 2014/0234734 | A1 | 8/2014 | Tsutsumi et al. |
| 2014/0308594 | A1 | 10/2014 | Dudney et al. |
| 2014/0349147 | A1 | 11/2014 | Shaffer, II et al. |
| 2014/0370404 | A1 | 12/2014 | Kato et al. |
| 2015/0079493 | A1 | 3/2015 | Guthrie |
| 2015/0099199 | A1 | 4/2015 | Bazant et al. |
| 2015/0136301 | A1 | 5/2015 | Cyman, Jr. et al. |
| 2016/0020477 | A1 | 1/2016 | Smeltz et al. |
| 2016/0036060 | A1 | 2/2016 | Brezovec |
| 2016/0240868 | A1 | 8/2016 | Warrington et al. |
| 2016/0308224 | A1 | 10/2016 | Morris-Cohen et al. |
| 2017/0054164 | A1 | 2/2017 | Goeltz et al. |

FOREIGN PATENT DOCUMENTS

| | | |
|---|---|---|
| JP | H-06-290795 | 10/1994 |
| JP | 2001-283879 A | 10/2001 |
| JP | 2005-228633 A | 8/2005 |
| JP | 2008-047313 A | 2/2008 |
| JP | 2008-078104 A | 4/2008 |
| JP | 2008-091110 A | 4/2008 |
| JP | 2008-166260 A | 7/2008 |
| JP | 2011-228059 A | 11/2011 |
| JP | 2012-252955 A | 12/2012 |
| JP | 2014-520382 A | 8/2014 |
| WO | WO-00/164189 A1 | 3/2000 |
| WO | WO-2010/033118 A1 | 3/2010 |
| WO | WO-2012/177255 A1 | 12/2012 |

OTHER PUBLICATIONS

International Search Report and Written Opinion dated Jan. 26, 2017, which issued in International Application No. PCT/US16/57963.

International Search Report and Written Opinion dated Jan. 19, 2017, which issued in International Application No. PCT/US16/56672.

R.K. Sen, et al., "Metal-Air Battery Assessment," U.S. Department of Energy Report for Contract DE-AC06-76RLO1830, May 1988, 84 pages.

R.P. Hollandsworth, et al., "Zinc/Ferricyanide Battery Development Phase IV," U.S. Department of Energy Report for Contract DE-AC04-76DP00789, May 1985, 278 pages.

Ma et al., "High-performance supercapacitor electrodes based on porous flexible carbon nanofiber paper treated by surface chemical etching," Chemical Engineering Journal, Aug. 2014.

McCreery, "Advanced Carbon Electrode Materials for Molecular Electrochemistry," Chem Rev, 2008, pp. 2646-2687, vol. 108.

Extended European Search Report from European Patent Application No. 14845729.4, dated May 8, 2017.

International Search Report and Written Opinion from PCT/US2017/030452, dated Jul. 3, 2017.

Japanese Office Action from 2016-544047, dated Jul. 3, 2018, 11 pages.

* cited by examiner

FLOW BATTERIES HAVING AN ELECTRODE WITH A DENSITY GRADIENT AND METHODS FOR PRODUCTION AND USE THEREOF

CROSS-REFERENCE TO RELATED APPLICATIONS

Not applicable.

STATEMENT REGARDING FEDERALLY SPONSORED RESEARCH OR DEVELOPMENT

Not applicable.

FIELD

The present disclosure generally relates to energy storage and, more specifically, to modifications and techniques for improving the performance of flow batteries and related electrochemical systems.

BACKGROUND

Electrochemical energy storage systems, such as batteries, supercapacitors and the like, have been widely proposed for large-scale energy storage applications. Various battery designs, including flow batteries, have been considered for this purpose. Compared to other types of electrochemical energy storage systems, flow batteries can be advantageous, particularly for large-scale applications, due to their ability to decouple the parameters of power density and energy density from one another.

Flow batteries generally include negative and positive active materials in corresponding electrolyte solutions, which are flowed separately across opposing faces of a membrane or separator in an electrochemical cell containing negative and positive electrodes. The flow battery is charged or discharged through electrochemical reactions of the active materials that occur inside the two half-cells. As used herein, the terms "active material," "electroactive material," "redox-active material" or variants thereof synonymously refer to materials that undergo a change in oxidation state during operation of a flow battery or like electrochemical energy storage system (i.e., during charging or discharging).

Although flow batteries hold significant promise for large-scale energy storage applications, they have often been plagued by sub-optimal energy storage performance (e.g., round trip energy efficiency) and limited cycle life, among other factors. Certain factors leading to sub-optimal performance are discussed hereinafter. Despite significant investigational efforts, no commercially viable flow battery technologies have yet been developed.

Balanced oxidation and reduction of the active materials in a flow battery are desirable electrochemical reactions, since they contribute to the battery's proper operation during charging and discharging cycles. Such reactions may be referred to herein as "productive reactions."

In addition to desirable productive reactions, undesirable parasitic reactions can also occur within one or both half-cells of flow batteries and related electrochemical systems. As used herein, the term "parasitic reaction" refer to any side electrochemical reaction that takes place in conjunction with productive reactions. Parasitic reactions can often involve a component of an electrolyte solution that is not the active material. Electrochemical reactions of an active material that render the active material unable to undergo reversible oxidation and reduction can also be considered parasitic in nature. Parasitic reactions that can commonly occur in electrochemical cells containing an aqueous electrolyte solution are evolution of hydrogen and/or oxidation by oxygen. Hydrogen evolution, for example, can at least partially discharge the negative electrolyte solution of an electrochemical cell. Related parasitic reactions can also occur in non-aqueous electrolyte solutions.

Discharge associated with parasitic reactions can decrease the operating efficiency and other performance parameters of a flow battery. In addition, parasitic reactions can change the pH of an electrolyte solution, which can destabilize the active material therein in some cases. In the case of a parasitic reaction that occurs preferentially in one half-cell over the other, an imbalance in state of charge can result between the negative and positive electrolyte solutions. The term "state of charge" (SOC) is a well understood electrochemical energy storage term that refers herein to the relative amounts of reduced and oxidized species at an electrode within a given half-cell of an electrochemical system. Charge imbalance between the electrolyte solutions of a flow battery can lead to mass transport limitations at one or both of the electrodes, thereby lowering the round-trip operating efficiency. Since the charge imbalance can be additive with each completed charge and discharge cycle, increasingly diminished performance of a flow battery can result due to parasitic reactions.

Charge rebalancing of one or both electrolyte solutions can be conducted to combat the effects of parasitic reactions. Although various charge rebalancing techniques are available, they can be costly and time-consuming to implement. Determining the true concentration of oxidized and reduced active material species in an electrolyte solution can oftentimes itself be difficult, thereby adding a further difficulty to the charge rebalancing process. While charge rebalancing of an electrolyte solution can often be accomplished given sufficient diligence, the accompanying pH changes can frequently be much more difficult to address.

Bipolar plates are often used in flow batteries and related electrochemical systems to place adjacent electrochemical cells in electrical communication with one another in an electrochemical stack. The bipolar plates can create another source of operating inefficiency through inducing contact resistance within a given electrochemical cell. As used herein, the term "contact resistance" refers to the contribution to the total resistance of an electrical system arising from an interface between two conductive surfaces. In particular, contact resistance at the interface between an electrode and a bipolar plate can often be a significant fraction of the total cell resistance.

In view of the foregoing, flow batteries and other electrochemical systems configured to decrease the incidence of parasitic reactions, contact resistance, and other performance-reducing factors would be highly desirable in the art. The present disclosure satisfies the foregoing needs and provides related advantages as well.

SUMMARY

In some embodiments, the present disclosure provides flow batteries including a first half-cell containing a first electrode, a second half-cell containing a second electrode, and a separator disposed between the first half-cell and the second half-cell. At least one of the first electrode and the second electrode has a density gradient such that a density of at least one of the first electrode and the second electrode increases outwardly from the separator.

In other various embodiments, methods for fabricating an electrochemical cell having an electrode with a density gradient include: providing a conductive material having a density gradient, and forming an electrochemical cell therefrom. The electrochemical cell includes a first half-cell containing a first electrode, a second half-cell containing a second electrode, and a separator disposed between the first half-cell and the second half-cell. At least one of the first electrode and the second electrode includes the conductive material having the density gradient, and a density of at least one of the first electrode and the second electrode increases outwardly from the separator.

In still other various embodiments, the present disclosure describes methods for operating a flow battery having an electrode with a density gradient. Such methods include: providing a flow battery having an electrochemical cell including a first half-cell containing a first electrode, a second half-cell containing a second electrode, and a separator disposed between the first half-cell and the second half-cell, and circulating a first electrolyte solution through the first half-cell and a second electrolyte solution through the second half-cell. At least one of the first electrode and the second electrode contains a conductive material having a density gradient, and a density of at least one of the first electrode and the second electrode increases outwardly from the separator. Convective flow of at least one of the first electrolyte solution and the second electrolyte solution occurs preferentially in a lower-density region of the first electrode or the second electrode proximate the separator.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
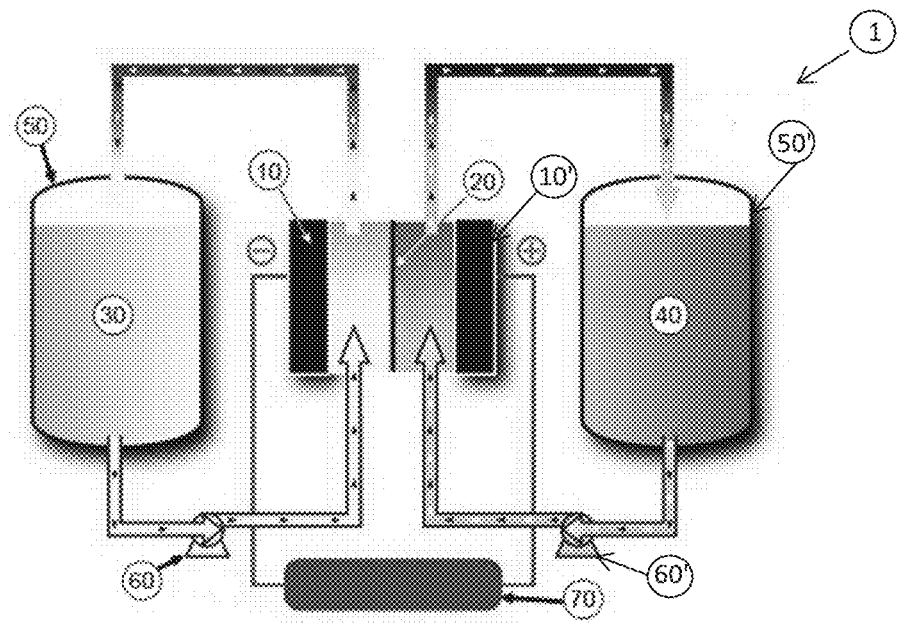
FIG. 1 shows a schematic of an illustrative flow battery containing a single electrochemical cell.

The present disclosure is directed, in part, to flow batteries having an electrode with a density gradient. The present disclosure is also directed, in part, to methods for fabricating an electrochemical cell having an electrode with a density gradient. The present disclosure is also directed, in part, to methods for improving the operating performance of electrochemical cells within flow batteries and related electrochemical systems by utilizing one or more electrodes having a density gradient.

The present disclosure may be understood more readily by reference to the following description taken in connection with the accompanying figures and examples, all of which form a part of this disclosure. It is to be understood that this disclosure is not limited to the specific products, methods, conditions or parameters described and/or shown herein. Further, the terminology used herein is for purposes of describing particular embodiments by way of example only and is not intended to be limiting unless otherwise specified. Similarly, unless specifically stated otherwise, any description herein directed to a composition is intended to refer to both solid and liquid versions of the composition, including solutions and electrolytes containing the composition, and electrochemical cells, flow batteries, and other energy storage systems containing such solutions and electrolytes. Further, it is to be recognized that where the disclosure herein describes an electrochemical cell, flow battery, or other energy storage system, it is to be appreciated that methods for operating the electrochemical cell, flow battery, or other energy storage system are also implicitly described.

It is also to be appreciated that certain features of the present disclosure may be described herein in the context of separate embodiments for clarity purposes, but may also be provided in combination with one another in a single embodiment. That is, unless obviously incompatible or specifically excluded, each individual embodiment is deemed to be combinable with any other embodiment(s) and the combination is considered to represent another distinct embodiment. Conversely, various features of the present disclosure that are described in the context of a single embodiment for brevity's sake may also be provided separately or in any sub-combination. Finally, while a particular embodiment may be described as part of a series of steps or part of a more general structure, each step or sub-structure may also be considered an independent embodiment in itself.

Unless stated otherwise, it is to be understood that each individual element in a list and every combination of individual elements in that list is to be interpreted as a distinct embodiment. For example, a list of embodiments presented as "A, B, or C" is to be interpreted as including the embodiments "A," "B," "C," "A or B," "A or C," "B or C," or "A, B, or C."

In the present disclosure, the singular forms of the articles "a," "an," and "the" also include the corresponding plural references, and reference to a particular numerical value includes at least that particular value, unless the context clearly indicates otherwise. Thus, for example, reference to "a material" is a reference to at least one of such materials and equivalents thereof.

In general, use of the term "about" indicates approximations that can vary depending on the desired properties sought to be obtained by the disclosed subject matter and is to be interpreted in a context-dependent manner based on functionality. Accordingly, one having ordinary skill in the art will be able to interpret a degree of variance on a case-by-case basis. In some instances, the number of significant figures used when expressing a particular value may be a representative technique of determining the variance permitted by the term "about." In other cases, the gradations in a series of values may be used to determine the range of variance permitted by the term "about." Further, all ranges in the present disclosure are inclusive and combinable, and references to values stated in ranges include every value within that range.

As discussed above, energy storage systems that are operable on a large scale while maintaining high efficiency values can be extremely desirable. Flow batteries have generated significant interest in this regard, but there remains considerable room for improving their operating characteristics. In particular, parasitic reactions and contact resistance represent two factors that can significantly impact the operating efficiency in conventional flow battery designs.

Parasitic reactions can be exceedingly detrimental to the performance of flow batteries and other electrochemical systems. At the very least, parasitic reactions can create an imbalance in state of charge between the two electrolyte solutions of a flow battery, which can impact the battery's performance over time and repeated cycles of charging and discharging. In addition, parasitic reactions can lead to undesirable changes in the pH of one or more of the electrolyte solutions. In conventional flow battery designs, parasitic reactions can be difficult to manage due to a number of operational difficulties.

Contact resistance can also be significant when connecting multiple electrochemical cells together in an electrochemical stack. Whereas resistance is a fixed property of a given material, contact resistance varies depending on the type and geometry of the interface that is present. A leading source of contact resistance within an electrochemical stack can occur at the interface between a bipolar plate and an electrode in a given electrochemical cell, since different materials are often used for forming the bipolar plate and the electrode, and the area of contact is often low. The contact resistance arising at the interface between abutted bipolar plates is often less. In view of the large number of individual cells that can be present in an electrochemical stack, however, even small contributions to the overall resistance can aggregate to a large value. Regardless of its source, increased resistance within a flow battery or other electrochemical system can undesirably impact the operating performance.

Given the issues associated with both contact resistance and parasitic reactions, including the secondary pH issues arising from parasitic reasons, the present inventors sought ways to minimize both parasitic reactions and contact resistance within a given electrochemical cell, such as within a flow battery. Surprisingly, the inventors discovered a simple modification to conventional electrochemical cell designs that can address both issues simultaneously. More specifically, the inventors discovered that by introducing a density gradient into at least one of the electrodes of an electrochemical cell, the incidence of parasitic reactions can be lessened and the cell's contact resistance can be decreased. Further details in this regard follow hereinbelow. Advantageously, such density gradients can be introduced into electrodes through a variety of facile manufacturing techniques, as also discussed hereinafter.

The electrochemical cells described herein are particularly advantageous with respect to parasitic reactions, since conventional cell designs offer no appreciable mechanism for minimizing the occurrence of parasitic reactions other than by changing the cell's operating conditions such that an overpotential for parasitic reactions is not exceeded and/or by changing the cell's chemical composition altogether. By changing an electrochemical cell in this manner, however, desired productive reactions of an active material may not occur at all, or they may not occur with sufficient rapidity. Thus, changing the operating conditions of a flow battery or other electrochemical system to mitigate parasitic reactions can be an untenable approach in many circumstances. In contrast, the electrochemical cells of the present disclosure address the occurrence of parasitic reactions without requiring a significant change in cell design, composition, and/or operating conditions.

Similarly, conventional electrochemical cell designs offer no reasonable way to address contact resistance other than by changing the cell architecture in some manner to decrease the overall resistance. Such approaches may not produce an electrochemical cell with desired operating characteristics and may undesirably affect other operating parameters, such as an increased incidence of parasitic reactions. Advantageously, the electrochemical cells described herein further address contact resistance issues without significantly changing the cell architecture and/or degrading other operational aspects. Furthermore, the electrochemical cells described herein can decrease mass transport limitations in a reaction zone proximate to a separator in the cell, thereby improving the cell's overall operating efficiency. Before discussing further specifics of the electrochemical cells of the present disclosure, illustrative flow battery configurations and their operating characteristics will first be described in greater detail hereinafter.

Unlike typical battery technologies (e.g., Li-ion, Ni-metal hydride, lead-acid, and the like), where active materials and other components are housed in a single assembly, flow batteries transport (e.g., via pumping) redox-active energy storage materials from storage tanks through an electrochemical stack containing one or more electrochemical cells. This design feature decouples the electrical energy storage system power from the energy storage capacity, thereby allowing for considerable design flexibility and cost optimization. FIG. 1 shows a schematic of an illustrative flow battery containing a single electrochemical cell. Although FIG. 1 shows a flow battery containing a single electrochemical cell, approaches for combining multiple electrochemical cells together are known and are discussed hereinbelow.

As shown in FIG. 1, flow battery system 1 includes an electrochemical cell that features separator 20 between electrodes 10 and 10' of the electrochemical cell. As used herein, the terms "separator" and "membrane" refer to an ionically conductive and electrically insulating material disposed between the positive and negative electrodes of an electrochemical cell. Electrodes 10 and 10' are formed from a suitably conductive material, such as a metal, carbon, graphite, and the like, and the materials for two can be the same or different. Although FIG. 1 has shown electrodes 10 and 10' as being spaced apart from separator 20, electrodes 10 and 10' can also be abutted with separator 20 in more particular embodiments (see FIG. 2 below). The material(s) forming electrodes 10 and 10' can be porous, such that they have a high surface area for contacting the electrolyte solutions containing first active material 30 and second active material 40, which are capable of being cycled between an oxidized state and a reduced state. For example, one or both of electrodes 10 and 10' can be formed from a porous carbon cloth or a carbon foam in some embodiments.

Pump 60 affects transport of first active material 30 from tank 50 to the electrochemical cell. The flow battery also suitably includes second tank 50' that contains second active material 40. Second active material 40 can be the same material as first active material 30, or it can be different. Second pump 60' can affect transport of second active material 40 to the electrochemical cell. Pumps can also be used to affect transport of active materials 30 and 40 from the electrochemical cell back to tanks 50 and 50' (not shown in FIG. 1). Other methods of affecting fluid transport, such as siphons, for example, can also suitably transport first and second active materials 30 and 40 into and out of the electrochemical cell. Also shown in FIG. 1 is power source or load 70, which completes the circuit of the electrochemical cell and allows a user to collect or store electricity during its operation.

It should be understood that FIG. 1 depicts a specific, non-limiting configuration of a particular flow battery. Accordingly, flow batteries consistent with the spirit of the present disclosure can differ in various aspects relative to the configuration of FIG. 1. As one example, a flow battery system can include one or more active materials that are solids, gases, and/or gases dissolved in liquids. Active materials can be stored in a tank, in a vessel open to the atmosphere, or simply vented to the atmosphere.

As indicated above, multiple electrochemical cells can also be combined with one another in an electrochemical stack in order to increase the rate that energy can be stored and released during operation. The amount of energy released is determined by the overall amount of active material that is present. An electrochemical stack utilizes bipolar plates between adjacent electrochemical cells to establish electrical communication but not fluid communication between the two cells. Thus, bipolar plates contain the electrolyte solutions within the individual electrochemical cells. Bipolar plates are generally fabricated from electrically conductive materials that are fluidically non-conductive on the whole. Suitable materials can include carbon, graphite, metal, or a combination thereof. Bipolar plates can also be fabricated from non-conducting polymers having a conductive material dispersed therein, such as carbon particles or fibers, metal particles or fibers, graphene, and/or carbon nanotubes. Although bipolar plates can be fabricated from the same types of conductive materials as can the electrodes of an electrochemical cell, they can lack the continuous porosity permitting an electrolyte solution to flow completely through the latter. It should be recognized, however, that bipolar plates are not necessarily entirely non-porous entities, however. Bipolar plates can have innate or designed flow channels that provide a greater surface area for allowing an electrolyte solution to contact the bipolar plate, but the porous features terminate at a location before the electrolyte solution can enter an adjacent electrochemical cell. Suitable flow channel configurations can include, for example, interdigitated flow channels. In some embodiments, the flow channels can be used to promote delivery of an electrolyte solution to an electrode within the electrochemical cell. Delivery of an electrolyte solution to an electrode via a bipolar plate is discussed in more detail hereinbelow.

Figure 2:
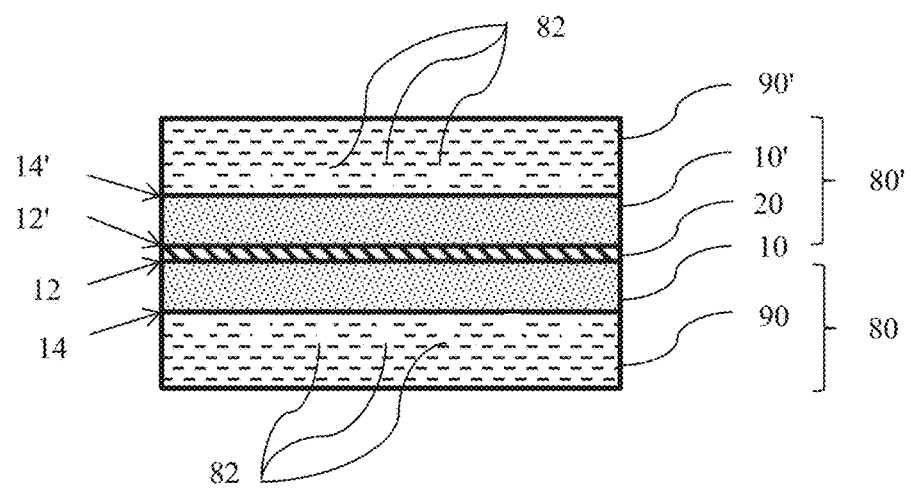
FIG. 2 shows a schematic of an illustrative electrochemical cell configuration containing a bipolar plate abutting each electrode.
Figure 3:
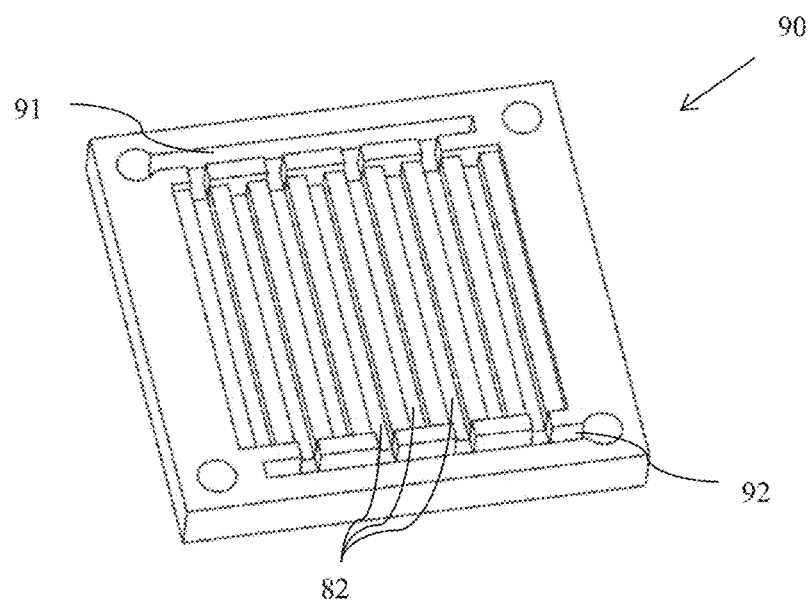
FIG. 3 shows an illustrative schematic of a bipolar plate containing interdigitated flow channels.

FIG. 2 shows a schematic of an illustrative electrochemical cell configuration containing a bipolar plate abutting each electrode. Where appropriate, common reference characters will be used to describe elements shown in a preceding figure. Referring to FIG. 2, negative half-cell 80 and positive half-cell 80' are disposed on opposing sides of separator 20. Negative half-cell 80 contains electrode 10 (i.e., the anode) abutted with separator 20 at interface 12, and bipolar plate 90 is, in turn, abutted against the opposing face of electrode 10 at interface 14. Positive half-cell 80' similarly contains electrode 10' (i.e., the cathode) abutted with the opposing face of separator 20 at interface 12', and bipolar plate 90' is, in turn, abutted against the opposing face of electrode 10' at interface 14'. Flow channels 82 extend partially within the interior of bipolar plates 90 and 90' and increase the degree of contact with the electrolyte solution. In some embodiments, flow channels 82 can be in an interdigitated configuration as shown in FIG. 3 below. Other configurations for flow channels include, for example, regular or irregular spacing, random directionality, tortuous interconnected pathways, random distributions and/or gradient distributions. In the interest of clarity, the fluid flow details shown in FIG. 1 are not presented in FIG. 2. However, it can be readily appreciated how the electrochemical cell configuration of FIG. 2 would be incorporated in FIG. 1, or how a plurality of electrochemical cells would be incorporated an electrochemical stack and connected to a fluid distribution manifold to deliver an electrolyte solution. For example, a fluid distribution manifold can be connected to an inlet on bipolar plates 90 and 90' to supply an electrolyte solution to electrodes 10 and 10', as shown hereinafter. For purposes of discussion herein, the electrochemical cell configuration of FIG. 2 will be considered representative of that present in a conventional flow battery.

FIG. 3 shows an illustrative schematic of a bipolar plate containing interdigitated flow channels. As shown in FIG. 3, bipolar plate 90 includes inlet channel 91 and outlet channel 92, and flow channels 82 are interdigitated with one another in between. Thus, a fluid distribution manifold (not shown) can be connected to inlet channel 91 to supply an electrolyte solution to alternating flow channels 82. After interacting with electrode 10, the electrolyte solution can migrate via convective flow to unfilled flow channels 82 beside those that are initially filled with electrolyte solution, and the electrolyte solution then exits bipolar plate 90 via outlet channel 92.

In general, the vast majority of productive reactions in conventional electrochemical cells occur at or in close proximity to the interface between the electrodes and the separator (i.e., at interfaces 12 and 12' in FIG. 2). Parasitic reactions, in contrast, are more prevalent at locations within the electrodes and at other conductive surfaces that are more distant from the separator.

Thus, the present inventors discovered that the incidence of parasitic reactions in an electrochemical cell can be decreased by improving the convective flow of electrolyte solution in proximity to interfaces 12 and 12'. That is, by preferentially supplying an electrolyte solution to a region where productive reactions are more prevalent, the overall ratio of productive reactions to parasitic reactions can be increased. In particular, the inventors discovered that by introducing a density gradient into at least one of the electrodes, increased convective flow of the corresponding electrolyte solution near the separator can be realized. Either of the electrodes can be modified to include a density gradient, depending upon the half-cell in which one wishes to mitigate the incidence of parasitic reactions. In many cases, it can be desirable to fabricate an electrochemical cell with both electrodes having a density gradient, since there are no apparent disadvantages to doing so and additional benefits can be realized, as discussed hereinafter.

More specifically, the inventors found that by providing at least one electrode in a flow battery with a density that increases outwardly from the separator (i.e., an increasing density from the separator toward the bipolar plate of a flow battery), the foregoing advantages can be realized. It is believed that the increased density of the electrode nearer the bipolar plate results from a decrease in the porosity of the electrode at that location. Thus, the inventors equivalently discovered that by providing an electrode with a porosity gradient in which the pore size in the electrode decreases from the separator to the bipolar plate, the foregoing advantages can be realized. Thus, by having a higher electrode porosity in proximity to the separator and a lower electrode porosity in proximity to the bipolar plate, the flow of an electrolyte solution can be preferentially shunted into portions of the electrode having the lower porosity. Since this location is proximate to the separator in the embodiments of the present disclosure, a decreased incidence of parasitic reactions can be realized. Further, the decreased pore space at locations that are spaced apart from the separator provide a much smaller electrode surface area for parasitic reactions to take place.

The density gradient and equivalent decrease in porosity at the face of the electrode contacting the bipolar plate can have additional benefits as well. Namely, provided that an additive filling the pores in the electrode is electrically conductive, decreased contact resistance at the bipolar plate can be realized. By lowering the contact resistance in a given electrochemical cell geometry, more efficient cell operation can be realized.

As indicated above, the electrode modifications of the present disclosure do not represent a dramatic change in conventional electrochemical cell geometries. Thus, electrodes having a density gradient of the type as described herein can be utilized as essentially a drop-in replacement in conventional manufacturing processes. Further, the inventors identified that a density gradient can be readily introduced into electrodes through a variety of simple manufacturing techniques, which are discussed in more detail hereinbelow. In particular, a material suitable for forming an electrode can have a density gradient introduced therein before assembly of an electrochemical cell, and cell assembly can take place thereafter. Thus, introduction of a density gradient into an electrode does not necessarily need to take place during assembly of the cell itself via a modified manufacturing process. This feature represents a significant manufacturing advantage.

Accordingly, in various embodiments, flow batteries of the present disclosure can include a first half-cell containing a first electrode, a second half-cell containing a second electrode, and a separator disposed between the first half-cell and the second-half-cell. At least one of the first electrode and the second electrode has a density gradient such that a density of at least one of the first electrode and the second electrode increases outwardly from the separator. In further embodiments, the flow batteries can include a first bipolar plate contacting the first electrode and a second bipolar plate contacting the second electrode. That is, the electrode density increases in a direction extending between the separator and the bipolar plate within each half-cell. Thus, at least one of the first electrode and the second electrode has a first density that is lower in proximity to the separator and a second density that is higher in proximity to the corresponding first bipolar plate and/or second bipolar plate. Equivalently, the porosity of at least one of the first electrode and the second electrode has a first porosity that is lower in proximity to the separator and a second porosity that is higher in proximity to the corresponding first bipolar plate and/or second bipolar plate.

In some embodiments, the density gradient extending between the separator and the first and/or second bipolar plate can be a continuous gradient. In a continuous gradient, once the density starts increasing, it continually increases (i.e., without the rate of change becoming zero) between the separator and the corresponding bipolar plate. The density may, in some embodiments, be constant in a low-density region of the electrode proximate the separator before the density begins continually increasing at a location spaced apart from the separator.

In other embodiments, the density gradient can be a stepped gradient. In a stepped gradient, the density can increase over some distance from the separator, and then the rate of change can become zero at some distance from the separator before increasing yet again. Again, the density may, in some embodiments, be constant in a low-density region of the electrode proximate the separator before the density begins increasing in a stepwise manner at a location spaced apart from the separator. Stepped gradients can be produced in several particularly facile manners, as discussed hereinbelow.

Depending on the particular half-cell in which one wants to mitigate the incidence of parasitic reactions and/or decrease contact resistance, one or both of the electrodes can be modified to have a density gradient. In some embodiments, the electrodes in both the first half-cell and the second half-cell can have a density gradient that increases outwardly from the separator. In other embodiments, the first electrode in the first half-cell can have such a density gradient and the second electrode in the second half-cell can have a substantially constant density (i.e., be unmodified). The first electrode can be either the anode or the cathode. In the drawings that follow, both electrodes will often be depicted as having a density gradient, but it is to be recognized that the electrodes can be modified individually as well. Modification of the electrode in the negative half-cell of a flow battery or similar electrochemical device can be especially desirable, since the pH changes accompanying parasitic generation of hydrogen can be particularly detrimental.

Figure 4:
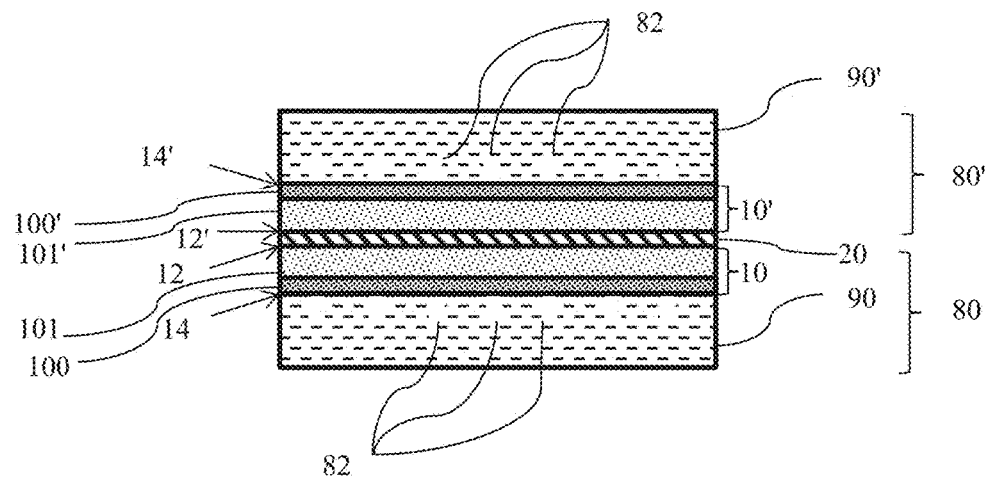
FIG. 4 shows a schematic of an illustrative electrochemical cell configuration in which the electrode density has been increased at locations removed from the separator.

FIG. 4 shows a schematic of an illustrative electrochemical cell configuration in which the electrode density has been increased at locations removed from the separator. As shown in FIG. 4, electrode 10 includes high-density region 100 in proximity to bipolar plate 90 and low-density region 101 in proximity to separator 20. Similarly, high-density region 100' and low-density region 101' are located within electrode 10'. Other than the foregoing density gradient within electrodes 10 and 10', the electrochemical cell configuration of FIG. 4 is identical to that of FIG. 2 and may be better understood by reference thereto. As indicated above, low-density regions 101 and 101' provide a more effective electrode surface area at which productive reactions can occur adjacent to separator 20. Similarly, the decreased electrode surface area within high-density regions 100 and 100' lowers the available surface area for parasitic reactions to occur at locations removed from separator 20.

Figure 5A:
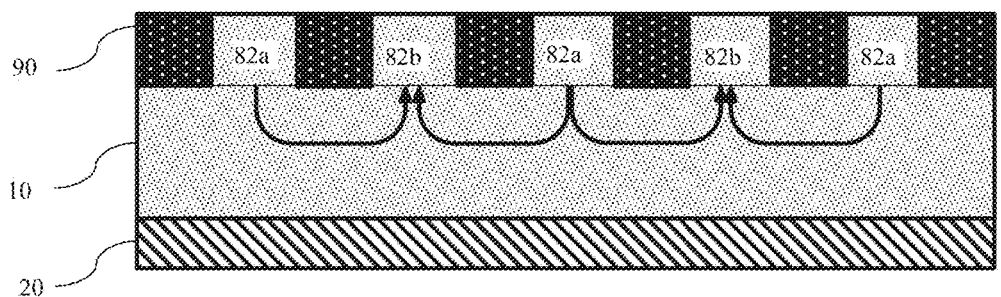
FIGS. 5A and 5B show illustrative schematics demonstrating differences in fluid flow dynamics in the absence and in the presence of an electrode having a density gradient.
Figure 5B:
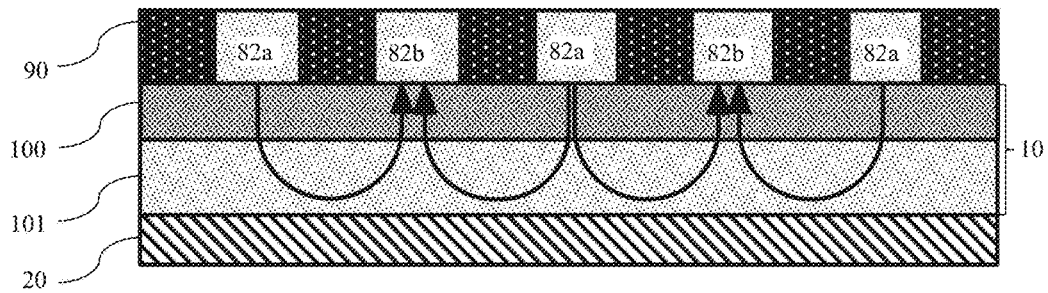

FIGS. 5A and 5B show illustrative schematics demonstrating differences in fluid flow dynamics in the absence and in the presence of an electrode having a density gradient. In the interest of conciseness, FIGS. 5A and 5B show only show a single half-cell, but it is to be recognized that the concepts of these figures can be easily extended to a full electrochemical cell in a flow battery.

FIG. 5A shows a half-cell of a flow battery in which electrode 10 does not have a density gradient. As shown in FIG. 5A, an electrolyte solution is supplied to electrode 10 through bipolar plate 90, which contains interdigitated flow channels. Specifically, the electrolyte solution enters through flow channels 82a, penetrates some distance into electrode 10, and then exits through flow channels 82b. Since electrode 10 has a substantially constant density in FIG. 5A, the penetration depth of the electrolyte solution is relatively small, and only a small fraction of the electrolyte solution reaches separator 20 in order for productive reactions to take place.

In contrast, FIG. 5B shows a half-cell of a flow battery in which electrode 10 does have a density gradient, specifically high-density region 100 adjacent to bipolar plate 90 and low-density region 101 adjacent to separator 20. That is, low-density region 101 is sandwiched between separator 20 and high-density region 100. As in FIG. 5A, electrolyte solution enters through flow channels 82a, penetrates some distance into electrode 10 and then exits through flow channels 82b. In this case, however, the penetration depth is much deeper and closer to separator 20 due to the increased electrode density proximate to bipolar plate 90.

Figure 6:
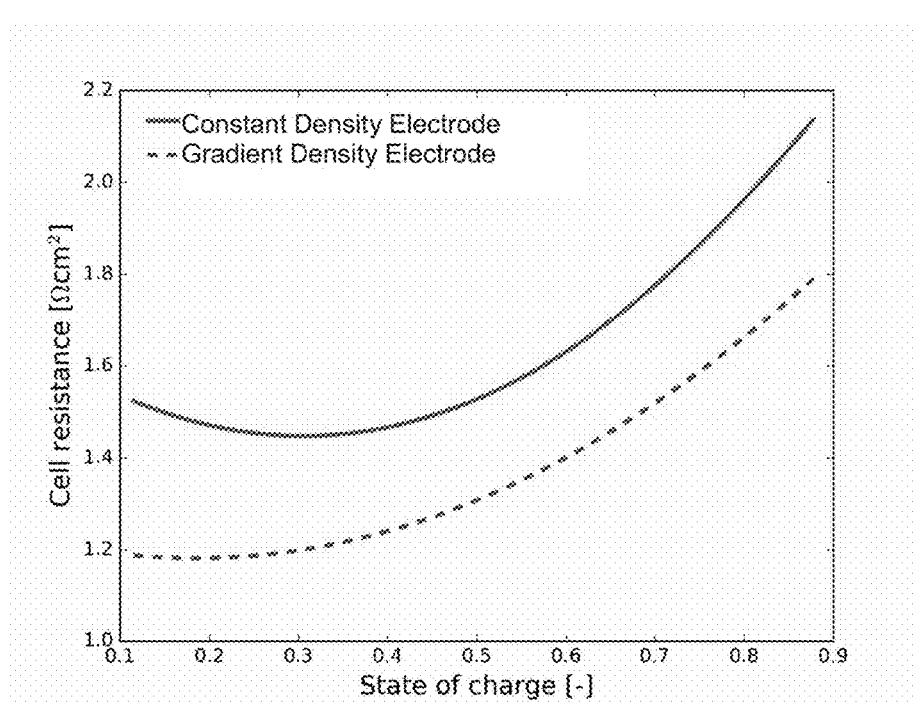
FIG. 6 shows a comparative plot of calculated cell resistance for a constant density electrode and a gradient density electrode as a function of state of charge.

FIG. 6 shows a comparative plot of calculated cell resistance for a constant density electrode and a gradient density electrode as a function of state of charge. As shown in FIG. 6, the gradient density electrode produces a lower cell resistance at all states of charge.

Various techniques for inducing a density gradient in an electrode or conductive material are discussed in greater detail hereinbelow. At this juncture, however, the modifications resulting in a density gradient within an electrode will be discussed in terms of structure and composition, rather than in terms of methodology for incorporation of such density variation.

In some embodiments, at least one of the first electrode and the second electrode can include a conductive additive deposited selectively upon the first electrode, the second electrode, or both the first and second electrode at a face opposite the separator. As used herein, the term "selectively" refer to a deposition technique that places more of the conductive additive on the electrode face opposite the separator than on the electrode face adjacent to the separator. Selective deposition does not necessarily exclude some degree of deposition on the electrode face adjacent to the separator, although that may indeed be the case. In any event, selective deposition of the conductive additive upon a face of the electrode opposite the separator can change the electrode's density where the conductive additive is deposited based on the amount deposited relative to the locations where the conductive additive is not deposited or not substantially deposited. Thus, the conductive additive can at least partially fill the pore space in proximity to the electrode face opposite the separator, thereby producing a density gradient. Suitable methods depositing the conductive additive are discussed hereinbelow.

In more particular embodiments, the conductive additive can include materials such as, for example, amorphous carbon, graphite, carbon nanotubes, graphene, or any combination thereof. Some metals can also be suitable for use in this regard. In some embodiments, a loading of the conductive additive in the electrode can range between about 0.1% to about 50% by weight, or about 0.5% to about 25% by weight, or about 1% to about 10% by weight.

Suitable carbon nanotubes for incorporation in the electrode can include single-wall carbon nanotubes, double-wall carbon nanotubes, multi-wall carbon nanotubes, or any combination thereof. The carbon nanotubes can be metallic, semimetallic, or semiconducting depending on their chirality. An established system of nomenclature for designating a carbon nanotube's chirality is recognized in the art and is distinguished by a double index (n, m), where n and m are integers that describe the cut and wrapping of hexagonal graphite when formed into a tubular structure. In addition to chirality, a carbon nanotube's diameter also influences its electrical and thermal conductivity values. Multi-wall carbon nanotubes typically have more complex electrical and thermal conductivity profiles than do single-wall carbon nanotubes due to interwall reactions that can occur between the individual nanotube layers. By contrast, there is no change in the electrical and thermal conductivity profiles across different portions of a single-wall carbon nanotube. Accordingly, in more particular embodiments of the present disclosure, the conductive additive can include a plurality of single-wall carbon nanotubes due to their favorable conductivity values.

In more particular embodiments, at least one of the first electrode and the second electrode can include a carbon cloth. In some embodiments, a conductive additive can be deposited selectively upon a face of the carbon cloth opposite the separator. Suitable conductive additives include those discussed above.

In other various embodiments, an electrode formed from a carbon cloth can have a density gradient introduced therein without including a conductive additive. More specifically, at least one of the first electrode and the second electrode can include a carbon cloth having a first density and a second carbon cloth having a second density, where the first density is lower than the second density, and the first carbon cloth is sandwiched between the separator and the second carbon cloth. This produces an electrode configuration similar to that depicted in FIG. 5B. That is, a lower-density first carbon cloth can be layered upon the separator, and the higher-density second carbon cloth can be layered on the lower-density first carbon cloth (i.e., spaced apart from the separator) to induce a density gradient in the electrode in accordance with the disclosure herein.

In some or other embodiments, the electrochemical cells and electrochemical stacks disclosed herein can be incorporated in flow batteries or similar electrochemical systems. Exemplary flow battery configurations are discussed in more detail hereinabove. Other electrochemical systems in which the electrochemical cells and electrochemical stacks of the present disclosure can be applicable include, for example, electrolyzers and fuel cell systems.

Materials for forming the bipolar plates used in the various embodiments of the present disclosure are not considered to be particularly limited, other than having sufficient electrical conductivity to establish electrical communication between adjacent cells in an electrochemical stack. Cost and ease of machining to produce a desired shape or flow channel geometry can also be considerations for choosing a particular conductive material over another. In more specific embodiments, the bipolar plate can be formed from a graphite block. The bipolar plate can have a plurality of flow channels defined therein, such as a plurality of interdigitated flow channels. The flow channels can be configured to deliver a first electrolyte solution to the first electrode and a second electrolyte solution to the second electrode.

Accordingly, methods for decreasing the incidence of parasitic reactions and/or contact resistance within a flow battery are implicitly described herein. In various embodiments, such methods can include: providing a flow battery having an electrochemical cell including a first half-cell containing a first electrode, a second half-cell containing a second electrode, and a separator disposed between the first half-cell and the second half-cell, and circulating a first electrolyte solution through the first half-cell and a second electrolyte solution through the second half-cell. At least one of the first electrode and the second electrode contains a conductive material having a density gradient, and a density of at least one of the first electrode and the second electrode increases outwardly from the separator. Convective flow of at least one of the first electrolyte solution and the second electrolyte solution occurs preferentially in a lower-density region of the first electrode or the second electrode proximate the separator. In more specific embodiments, the first electrolyte solution and the second electrolyte solution can be circulated through a plurality of flow channels within a first bipolar plate contacting the first electrode and a second bipolar plate contacting the second electrode (see FIGS. 3 and 5B).

In further embodiments, a plurality of the electrochemical cells can be connected in series with one another in an electrochemical stack. The bipolar plates from adjacent electrochemical cells can abut one another, or a bipolar plate can be shared between adjacent electrochemical cells.

In related embodiments, methods for fabricating an electrochemical cell having at least one electrode with a density gradient are also described herein. The methods can include: providing a conductive material having a density gradient, and forming an electrochemical cell therefrom. The electrochemical cell includes a first half-cell containing a first electrode, a second half-cell containing a second electrode, and a separator disposed between the first half-cell and the second half-cell. At least one of the first electrode and the second electrode includes the conductive material having the density gradient, and a density of at least one of the first electrode and the second electrode increases outwardly from the separator. In further embodiments, a first bipolar plate contacts the first electrode and a second bipolar plate contacts the second electrode In some embodiments, the methods can include introducing the density gradient into the conductive material by selectively depositing a conductive additive onto a first face of the conductive material. In some embodiments, the chosen deposition technique can deposit the conductive additive with exclusion of deposition on a second face of the conductive material.

In some embodiments, a suitable deposition technique for the conductive additive can include chemical vapor deposition (CVD). CVD techniques can be particularly useful for depositing conductive additives such as, for example, amorphous carbon, graphite, carbon nanotubes, and graphene. Suitable CVD techniques for these materials will be familiar to one having ordinary skill in the art and need not be described in further detail herein.

Other suitable deposition techniques for applying a conductive additive to a conductive material can include applying a solvent dispersion of the conductive additive onto a first face of the conductive material. For example, in some embodiments, a solvent dispersion of the conductive additive can be applied to the conductive material by spraying, painting, and/or dip coating techniques. Again, details regarding such deposition techniques will be familiar to one having ordinary skill in the art.

As an alternative to adjusting the density of a conductive material through application of a conductive additive, a density gradient can also be introduced through subtractive processes as well. In such embodiments, the density of the conductive material decreases where removal has taken place compared to where it has not. More specifically, such methods can include introducing a density gradient into the conductive material by selectively removing at least a portion of the conductive material from a first face of the conductive material. In some cases, the selective removal can take place without substantial removal of the conductive material from a second face of the conductive material. In other instances, the extent of removal of the conductive material from the first face is greater than the extent of removal at the second face. In either event, the first face of the conductive material becomes disposed proximate the separator in an electrochemical cell in the embodiments of the present disclosure, and the higher-density second face is placed in proximity to the appropriate bipolar plate. Suitable techniques for removing a portion of the conductive material at a given face can include, for example, laser ablation, chemical etching, needling, and any combination thereof.

In still other alternative embodiments, the conductive material need not necessarily undergo modification at all in order to introduce a density gradient into an electrode. Instead, two or more conductive materials having different densities can be layered upon one another to produce a density gradient in an layered conductive material. Accordingly, in some embodiments, methods of the present disclosure can include introducing a density gradient into the conductive material by placing at least one layer of a first conductive material upon at least one layer of a second conductive material to form a layered conductive material in which the first and second conductive materials have different densities. In the case of the first conductive material having a lower density, the first conductive material abuts the separator, and the second conductive material is spaced apart from the separator. That is, in such embodiments, the first conductive material is sandwiched between the separator and the second conductive material. In more specific embodiments, the first conductive material and the second conductive material can include carbon cloths having different densities.

As indicated above, the various embodiments of the present disclosure can desirably decrease the incidence of parasitic reactions that occur within an electrochemical cell. More particularly, the embodiments of the present disclosure provide a ratio of productive reactions to parasitic reactions at least exceeding 5 when the flow battery is in operation. Higher ratios of productive reactions to parasitic reactions can also be realized. In some embodiments, a ratio of productive reactions to parasitic reactions can be about 10 or above, or about 20 or above, or about 30 or above, or about 40 or above, or about 50 or above, or about 100 or above, or about 200 or above, or about 500 or above, or about 1000 or above. A suitable ratio of productive reactions to parasitic reactions can vary from application to application. Accordingly, the design of a given electrochemical cell can incorporate any number of the features described hereinabove to achieve a given ratio of productive reactions to parasitic reactions. A suitable ratio can be determined for a given application based upon optimizing current efficiency versus cell resistance.

In some embodiments, flow batteries of the present disclosure can include an active material in one or more electrolyte solutions that is a coordination complex. As used herein, the terms "coordination complex" and "coordination compound" refer to any compound having a metal bound to one or more ligands through a covalent bond. Due to their variable oxidation states, transition metals can be highly desirable for use within the active materials of a flow battery. Cycling between the accessible oxidation states can result in the conversion of chemical energy into electrical energy. Lanthanide metals can be used similarly in this regard in alternative embodiments. Particularly desirable transition metals for inclusion in a flow battery include, for example, Al, Cr, Ti and Fe. For purposes of the present disclosure, Al is to be considered a transition metal. In some embodiments, coordination complexes within a flow battery can include at least one catecholate or substituted catecholate ligand. Sulfonated catecholate ligands can be particularly desirable ligands due to their ability to promote solubility of coordination complexes in which they are present.

Other ligands that can be present in coordination complexes, alone or in combination with one or more catecholate or substituted catecholate ligands, include, for example, ascorbate, citrate, glycolate, a polyol, gluconate, hydroxyalkanoate, acetate, formate, benzoate, malate, maleate, phthalate, sarcosinate, salicylate, oxalate, urea, polyamine, aminophenolate, acetylacetonate, and lactate. Where chemically feasible, it is to be recognized that such ligands can be optionally substituted with at least one group selected from among $C_{1-6}$ alkoxy, $C_{1-6}$ alkyl, $C_{1-6}$ alkenyl, $C_{1-6}$ alkynyl, 5- or 6-membered aryl or heteroaryl groups, a boronic acid or a derivative thereof, a carboxylic acid or a derivative thereof, cyano, halide, hydroxyl, nitro, sulfonate, a sulfonic acid or a derivative thereof, a phosphonate, a phosphonic acid or a derivative thereof, or a glycol, such as polyethylene glycol. Alkanoate includes any of the alpha, beta, and gamma forms of these ligands. Polyamines include, but are not limited to, ethylenediamine, ethylenediamine tetraacetic acid (EDTA), and diethylenetriamine pentaacetic acid (DTPA).

Other examples of ligands can be present include monodentate, bidentate, and/or tridentate ligands. Examples of monodentate ligands that can be present in a coordination complex include, for example, carbonyl or carbon monoxide, nitride, oxo, hydroxo, water, sulfide, thiols, pyridine, pyrazine, and the like. Examples of bidentate ligands that can be present in a coordination complex include, for example, bipyridine, bipyrazine, ethylenediamine, diols (including ethylene glycol), and the like. Examples of tridentate ligands that can be present a coordination complex include, for example, terpyridine, diethylenetriamine, triazacyclononane, tris(hydroxymethyl)aminomethane, and the like.

The active materials in a flow battery can be disposed in an aqueous electrolyte solution in which the active material is dissolved. As used herein, the term "aqueous electrolyte solution" refers to a homogeneous liquid phase with water as a predominant solvent in which an active material is at least partially solubilized, ideally fully solubilized. This definition encompasses both solutions in water and solutions containing a water-miscible organic solvent as a minority component of an aqueous phase.

Illustrative water-miscible organic solvents that can be present in an aqueous electrolyte solution include, for example, alcohols and glycols, optionally in the presence of one or more surfactants or other components discussed below. In more specific embodiments, an aqueous electrolyte solution can contain at least about 98% water by weight. In other more specific embodiments, an aqueous electrolyte solution can contain at least about 55% water by weight, or at least about 60% water by weight, or at least about 65% water by weight, or at least about 70% water by weight, or at least about 75% water by weight, or at least about 80% water by weight, or at least about 85% water by weight, or at least about 90% water by weight, or at least about 95% water by weight. In some embodiments, an aqueous electrolyte solution can be free of water-miscible organic solvents and consist of water alone as a solvent.

In further embodiments, an aqueous electrolyte solution can include a viscosity modifier, a wetting agent, or any combination thereof. Suitable viscosity modifiers can include, for example, corn starch, corn syrup, gelatin, glycerol, guar gum, pectin, and the like. Other suitable examples will be familiar to one having ordinary skill in the art. Suitable wetting agents can include, for example, various non-ionic surfactants and/or detergents. In some or other embodiments, an aqueous electrolyte solution can further include a glycol or a polyol. Suitable glycols can include, for example, ethylene glycol, diethylene glycol, and polyethylene glycol. Suitable polyols can include, for example, glycerol, mannitol, sorbitol, pentaerythritol, and tris(hydroxymethyl)aminomethane. Inclusion of any of these components in an aqueous electrolyte solution can help promote dissolution of a coordination complex or similar active material and/or reduce viscosity of the aqueous electrolyte solution for conveyance through a flow battery, for example.

In addition to a solvent and a coordination complex as an active material, an aqueous electrolyte solution can also include one or more mobile ions (i.e., an extraneous electrolyte). In some embodiments, suitable mobile ions can include proton, hydronium, or hydroxide. In other various embodiments, mobile ions other than proton, hydronium, or hydroxide can be present, either alone or in combination with proton, hydronium or hydroxide. Such alternative mobile ions can include, for example, alkali metal or alkaline earth metal cations (e.g., $Li^+$, $Na^+$, $Mg^{2+}$, $Ca^{2+}$ and $Sr^{2+}$) and halides (e.g., $F^-$, $Cl^-$ or $Br^-$). Other suitable mobile ions can include, for example, ammonium and tetraalkylammonium ions, chalcogenides, phosphate, hydrogen phosphate, phosphonate, nitrate, sulfate, nitrite, sulfite, perchlorate, tetrafluoroborate, hexafluorophosphate, and any combination thereof. In some embodiments, less than about 50% of the mobile ions can constitute protons, hydronium, or hydroxide. In other various embodiments, less than about 40%, less than about 30%, less than about 20%, less than about 10%, less than about 5%, or less than about 2% of the mobile ions can constitute protons, hydronium, or hydroxide.

Flow batteries can provide sustained charge or discharge cycles of several hour durations. As such, they can be used to smooth energy supply/demand profiles and provide a mechanism for stabilizing intermittent power generation assets (e.g., from renewable energy sources such as solar and wind energy). It should be appreciated, then, that various embodiments of the present disclosure include energy storage applications where such long charge or discharge durations are desirable. For example, in non-limiting examples, the flow batteries of the present disclosure can be connected to an electrical grid to allow renewables integration, peak load shifting, grid firming, baseload power generation and consumption, energy arbitrage, transmission and distribution asset deferral, weak grid support, frequency regulation, or any combination thereof. When not connected to an electrical grid, the flow batteries of the present disclosure can be used as power sources for remote camps, forward operating bases, off-grid telecommunications, remote sensors, the like, and any combination thereof. Further, while the disclosure herein is generally directed to flow batteries, it is to be appreciated that other electrochemical energy storage media can incorporate the electrolyte solutions and coordination complexes described herein, specifically those utilizing stationary electrolyte solutions.

In some embodiments, flow batteries can include: a first chamber containing a negative electrode contacting a first aqueous electrolyte solution; a second chamber containing a positive electrode contacting a second aqueous electrolyte solution, and a separator disposed between the first and second electrolyte solutions. The chambers provide separate reservoirs within the cell, through which the first and/or second electrolyte solutions circulate so as to contact the respective electrodes and the separator. Each chamber and its associated electrode and electrolyte solution define a corresponding half-cell. The separator provides several functions which include, for example, (1) serving as a barrier to mixing of the first and second electrolyte solutions, (2) electrically insulating to reduce or prevent short circuits between the positive and negative electrodes, and (3) to facilitate ion transport between the positive and negative electrolyte chambers, thereby balancing electron transport during charge and discharge cycles. The negative and positive electrodes provide a surface where electrochemical reactions can take place during charge and discharge cycles. During a charge or discharge cycle, electrolyte solutions can be transported from separate storage tanks through the corresponding chambers, as shown in FIG. 1. In a charging cycle, electrical power can be applied to the cell such that the active material contained in the second electrolyte solution undergoes a one or more electron oxidation and the active material in the first electrolyte solution undergoes a one or more electron reduction. Similarly, in a discharge cycle the second active material is reduced and the first active material is oxidized to generate electrical power.

The separator can be a porous membrane in sonic embodiments and/or an ionomer membrane in other various embodiments. In some embodiments, the separator can be formed from an ionically conductive polymer. Regardless of its type, the separator or membrane can be ionically conductive toward various ions.

Polymer membranes can be anion- or cation-conducting electrolytes. Where described as an "ionomer," the term refers to polymer membrane containing both electrically neutral repeating units and ionized repeating units, where the ionized repeating units are pendant and covalently bonded to the polymer backbone. In general, the fraction of ionized units can range from about 1 mole percent to about 90 mole percent. For example, in some embodiments, the content of ionized units is less than about 15 mole percent; and in other embodiments, the ionic content is higher, such as greater than about 80 mole percent. In still other embodiments, the ionic content is defined by an intermediate range, for example, in a range of about 15 to about 80 mole percent. Ionized repeating units in an ionomer can include anionic functional groups such as sulfonate, carboxylate, and the like. These functional groups can be charge balanced by, mono-, di-, or higher-valent cations, such as alkali or alkaline earth metals. Ionomers can also include polymer compositions containing attached or embedded quaternary ammonium, sulfonium, phosphazenium, and guanidinium residues or salts. Suitable examples will be familiar to one having ordinary skill in the art.

In some embodiments, polymers useful as a separator can include highly fluorinated or perfluorinated polymer backbones. Certain polymers useful in the present disclosure can include copolymers of tetrafluoroethylene and one or more fluorinated, acid-functional co-monomers, which are commercially available as NAFION™ perfluorinated polymer electrolytes from DuPont. Other useful perfluorinated polymers can include copolymers of tetrafluoroethylene and $FSO_2$—$CF_2CF_2CF_2CF_2$—O—CF=$CF_2$, FLEMION™ and SELEMION™.

Additionally, substantially non-fluorinated membranes that are modified with sulfonic acid groups (or cation exchanged sulfonate groups) can also be used. Such membranes can include those with substantially aromatic backbones such as, for example, polystyrene, polyphenylene, biphenylsulfone (BPSH), or thermoplastics such as polyetherketones and polyethersulfones.

Battery-separator style porous membranes, can also be used as the separator. Because they contain no inherent ionic conduction capabilities, such membranes are typically impregnated with additives in order to function. These membranes typically contain a mixture of a polymer and inorganic filler, and open porosity. Suitable polymers can include, for example, high density polyethylene, polypropylene, polyvinylidene difluoride (PVDF), or polytetrafluoroethylene (PTFE). Suitable inorganic fillers can include silicon carbide matrix material, titanium dioxide, silicon dioxide, zinc phosphide, and ceria.

Separators can also be formed from polyesters, polyetherketones, poly (vinyl chloride), vinyl polymers, and substituted vinyl polymers. These can be used alone or in combination with any previously described polymer.

Porous separators are non-conductive membranes which allow charge transfer between two electrodes via open channels filled with electrolyte. The permeability increases the probability of active materials passing through the separator from one electrode to another and causing cross-contamination and/or reduction in cell energy efficiency. The degree of this cross-contamination can depend on, among other features, the size (the effective diameter and channel length), and character (hydrophobicity/hydrophilicity) of the pores, the nature of the electrolyte, and the degree of wetting between the pores and the electrolyte.

The pore size distribution of a porous separator is generally sufficient to substantially prevent the crossover of active materials between the two electrolyte solutions. Suitable porous membranes can have an average pore size distribution of between about 0.001 nm and 20 micrometers, more typically between about 0.001 nm and 100 nm. The size distribution of the pores in the porous membrane can be substantial. In other words, a porous membrane can contain a first plurality of pores with a very small diameter (approximately less than 1 nm) and a second plurality of pores with a very large diameter (approximately greater than 10 micrometers). The larger pore sizes can lead to a higher amount of active material crossover. The ability for a porous membrane to substantially prevent the crossover of active materials can depend on the relative difference in size between the average pore size and the active material. For example, when the active material is a metal center in a coordination complex, the average diameter of the coordination complex can be about 50% greater than the average pore size of the porous membrane. On the other hand, if a porous membrane has substantially uniform pore sizes, the average diameter of the coordination complex can be about 20% larger than the average pore size of the porous membrane. Likewise, the average diameter of a coordination complex is increased when it is further coordinated with at least one water molecule. The diameter of a coordination complex of at least one water molecule is generally considered to be the hydrodynamic diameter. In such embodiments, the hydrodynamic diameter is generally at least about 35% greater than the average pore size. When the average pore size is substantially uniform, the hydrodynamic radius can be about 10% greater than the average pore size.

In some embodiments, the separator can also include reinforcement materials for greater stability. Suitable reinforcement materials can include nylon, cotton, polyesters, crystalline silica, crystalline titania, amorphous silica, amorphous titania, rubber, asbestos, wood or any combination thereof.

Separators within the flow batteries of the present disclosure can have a membrane thickness of less than about 500 micrometers, or less than about 300 micrometers, or less than about 250 micrometers, or less than about 200 micrometers, or less than about 100 micrometers, or less than about 75 micrometers, or less than about 50 micrometers, or less than about 30 micrometers, or less than about 25 micrometers, or less than about 20 micrometers, or less than about 15 micrometers, or less than about 10 micrometers. Suitable separators can include those in which the flow battery is capable of operating with a current efficiency of greater than about 85% with a current density of 100 mA/cm$^2$ when the separator has a thickness of 100 micrometers. In further embodiments, the flow battery is capable of operating at a current efficiency of greater than 99.5% when the separator has a thickness of less than about 50 micrometers, a current efficiency of greater than 99% when the separator has a thickness of less than about 25 micrometers, and a current efficiency of greater than 98% when the separator has a thickness of less than about 10 micrometers. Accordingly, suitable separators include those in which the flow battery is capable of operating at a voltage efficiency of greater than 60% with a current density of 100 mA/cm$^2$. In further embodiments, suitable separators can include those in which the flow battery is capable of operating at a voltage efficiency of greater than 70%, greater than 80% or even greater than 90%.

The diffusion rate of the first and second active materials through the separator can be less than about $1\times10^{-5}$ mol cm$^{-2}$ day$^{-1}$, or less than about $1\times10^{-6}$ mol cm$^{-2}$ day$^{-1}$, or less than about $1\times10^{-7}$ mol cm$^{-2}$ day$^{-1}$, or less than about $1\times10^{-9}$ mol cm$^{-2}$ day$^{-1}$, or less than about $1\times10^{-11}$ mol cm$^{-2}$ day$^{-1}$, or less than about $1\times10^{-13}$ mol cm$^{-2}$ day$^{-1}$, or less than about $1\times10^{-15}$ mol cm$^{-2}$ day$^{-1}$.

The flow batteries can also include an external electrical circuit in electrical communication with the first and second electrodes. The circuit can charge and discharge the flow battery during operation. Reference to the sign of the net ionic charge of the first, second, or both active materials relates to the sign of the net ionic charge in both oxidized and reduced forms of the redox active materials under the conditions of the operating flow battery. Further exemplary embodiments of a flow battery provide that (a) the first active material has an associated net positive or negative charge and is capable of providing an oxidized or reduced form over an electric potential in a range of the negative operating potential of the system, such that the resulting oxidized or reduced form of the first active material has the same charge sign (positive or negative) as the first active material and the ionomer membrane also has a net ionic charge of the same sign; and (b) the second active material has an associated net positive or negative charge and is capable of providing an oxidized or reduced form over an electric potential in a range of the positive operating potential of the system, such that the resulting oxidized or reduced form of the second active material has the same charge sign (positive or negative sign) as the second active material and the ionomer membrane also has a net ionic charge of the same sign; or both (a) and (b). The matching charges of the first and/or second active materials and the ionomer membrane can provide a high selectivity. More specifically, charge matching can provide less than about 3%, less than about 2%, less than about 1%, less than about 0.5%, less than about 0.2%, or less than about 0.1% of the molar flux of ions passing through the ionomer membrane as being attributable to the first or second active material. The term "molar flux of ions" refers to the amount of ions passing through the ionomer membrane, balancing the charge associated with the flow of external electricity/electrons. That is, the flow battery is capable of operating or operates with the substantial exclusion of the active materials by the ionomer membrane, and such exclusion can be promoted through charge matching.

Flow batteries of the present disclosure can have one or more of the following operating characteristics: (a) where, during the operation of the flow battery, the first or second active materials comprise less than about 3% of the molar flux of ions passing through the ionomer membrane; (b) where the round trip current efficiency is greater than about 70%, greater than about 80%, or greater than about 90%; (c) where the round trip current efficiency is greater than about 90%; (d) where the sign of the net ionic charge of the first, second, or both active materials is the same in both oxidized and reduced forms of the active materials and matches that of the ionomer membrane; (e) where the ionomer membrane has a thickness of less than about 100 µm, less than about 75 µm, less than about 50 µm, or less than about 250 µm; (f) where the flow battery is capable of operating at a current density of greater than about 100 mA/cm$^2$ with a round trip voltage efficiency of greater than about 60%; and (g) where the energy density of the electrolyte solutions is greater than about 10 Wh/L, greater than about 20 Wh/L, or greater than about 30 Wh/L.

In some cases, a user may desire to provide higher charge or discharge voltages than available from a single electrochemical cell. In such cases, several battery cells can be connected in series such that the voltage of each cell is additive. This forms a bipolar stack, also referred to as an electrochemical stack. As discussed herein, a bipolar plate can be employed to connect adjacent electrochemical cells in a bipolar stack, which allows for electron transport to take place but prevents fluid or gas transport between adjacent cells. The positive electrode compartments and negative electrode compartments of individual cells can be fluidically connected via common positive and negative fluid manifolds in the bipolar stack. In this way, individual cells can be stacked in series to yield a voltage appropriate for DC applications or conversion to AC applications.

In additional embodiments, the cells, bipolar stacks, or batteries can be incorporated into larger energy storage systems, suitably including piping and controls useful for operation of these large units. Piping, control, and other equipment suitable for such systems are known in the art, and can include, for example, piping and pumps in fluid communication with the respective chambers for moving electrolyte solutions into and out of the respective chambers and storage tanks for holding charged and discharged electrolytes. The cells, cell stacks, and batteries of this disclosure can also include an operation management system. The operation management system can be any suitable controller device, such as a computer or microprocessor, and can contain logic circuitry that sets operation of any of the various valves, pumps, circulation loops, and the like.

In more specific embodiments, a flow battery system can include a flow battery (including a cell or cell stack) storage tanks and piping for containing and transporting the electrolyte solutions; control hardware and software (which may include safety systems); and a power conditioning unit. The flow battery cell stack accomplishes the conversion of charging and discharging cycles and determines the peak power. The storage tanks contain the positive and negative active materials, such as the coordination complexes disclosed herein, and the tank volume determines the quantity of energy stored in the system. The control software, hardware, and optional safety systems suitably include sensors, mitigation equipment and other electronic/hardware controls and safeguards to ensure safe, autonomous, and efficient operation of the flow battery system. A power conditioning unit can be used at the front end of the energy storage system to convert incoming and outgoing power to a voltage and current that is optimal for the energy storage system or the application. For the example of an energy storage system connected to an electrical grid, in a charging cycle the power conditioning unit can convert incoming AC electricity into DC electricity at an appropriate voltage and current for the cell stack. In a discharging cycle, the stack produces DC electrical power and the power conditioning unit converts it to AC electrical power at the appropriate voltage and frequency for grid applications.

Where not otherwise defined hereinabove or understood by one having ordinary skill in the art, the definitions in the following paragraphs will be applicable to the present disclosure.

As used herein, the term "energy density" refers to the amount of energy that can be stored, per unit volume, in the active materials. Energy density refers to the theoretical energy density of energy storage and can be calculated by Equation 1:

$$\text{Energy density} = (26.8 \text{ A-h/mol}) \times OCV \times [e^-] \quad (1)$$

where OCV is the open circuit potential at 50% state of charge, (26.8 A-h/mol) is Faraday's constant, and $[e^-]$ is the concentration of electrons stored in the active material at 99% state of charge. In the case that the active materials largely are an atomic or molecular species for both the positive and negative electrolyte, $[e^-]$ can be calculated by Equation 2 as:

$$[e^-] = [\text{active materials}] \times N/2 \quad (2)$$

where [active materials] is the molar concentration of the active material in either the negative or positive electrolyte, whichever is lower, and N is the number of electrons transferred per molecule of active material. The related term "charge density" refers to the total amount of charge that each electrolyte contains. For a given electrolyte, the charge density can be calculated by Equation 3

$$\text{Charge density} = (26.8 \text{ A-h/mol}) \times [\text{active material}] \times N \quad (3)$$

where [active material] and n are as defined above.

As used herein, the term "current density" refers to the total current passed in an electrochemical cell divided by the geometric area of the electrodes of the cell and is commonly reported in units of mA/cm².

As used herein, the term "current efficiency" ($I_{eff}$) is the ratio of the total charge produced upon discharge of a cell to the total charge passed during charging. The current efficiency can be a function of the state of charge of the flow battery. In some non-limiting embodiments, the current efficiency can be evaluated over a state of charge range of about 35% to about 60%.

As used herein, the term "voltage efficiency" is the ratio of the observed electrode potential, at a given current density, to the half-cell potential for that electrode (×100%). Voltage efficiencies can be described for a battery charging step, a discharging step, or a "round trip voltage efficiency." The round trip voltage efficiency ($V_{eff, RT}$) at a given current density can be calculated from the cell voltage at discharge ($V_{discharge}$) and the voltage at charge ($V_{charge}$) using Equation 4:

$$V_{eff, RT} = V_{discharge}/V_{charge} \times 100\% \quad (4)$$

As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to a reversible hydrogen electrode. The negative electrode is associated with a first electrolyte solution and the positive electrode is associated with a second electrolyte solution, as described herein. The electrolyte solutions associated with the negative and positive electrodes may be described as negolytes and posolytes, respectively.

Although the disclosure has been described with reference to the disclosed embodiments, those skilled in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. A flow battery comprising:
   a first half-cell containing a first electrode;
   a second half-cell containing a second electrode; and
   a separator disposed between the first half-cell and the second half-cell;
   wherein at least one of the first electrode and the second electrode has a density gradient such that a density of at least one of the first electrode and the second electrode increases outwardly from the separator, such that the density of the at least one of the first electrode and the second electrode increases from the separator to a bipolar plate of the flow battery.

2. The flow battery of claim 1, wherein the density gradient is a continuous gradient.

3. The flow battery of claim 1, wherein the density gradient is a stepped gradient.

4. The flow battery of claim 1, wherein at least one of the first electrode and the second electrode comprises a conductive additive deposited selectively upon the first electrode, the second electrode, or both the first and second electrodes at a face opposite the separator.

5. The flow battery of claim 4, wherein the conductive additive comprises amorphous carbon, graphite, carbon nanotubes, graphene, or any combination thereof.

6. The flow battery of claim 1, wherein at least one of the first electrode and the second electrode comprises a carbon cloth.

7. The flow battery of claim 6, wherein the carbon cloth comprises a conductive additive deposited selectively upon the first electrode, the second electrode, or both the first and second electrodes at a face opposite the separator.

8. The flow battery of claim 7, wherein the conductive additive comprises amorphous carbon, graphite, carbon nanotubes, graphene, or any combination thereof.

9. The flow battery of claim 1, wherein at least one of the first electrode and the second electrode comprises a first carbon cloth having a first density and a second carbon cloth having a second density;

wherein the first density is lower than the second density, and the first carbon cloth is sandwiched between the separator and the second carbon cloth.

10. The flow battery of claim 1, wherein both the first electrode and the second electrode have a density gradient.

11. The flow battery of claim 1, wherein the bipolar plate further comprises:
a first bipolar plate contacting the first electrode and a second bipolar plate contacting the second electrode.

12. The flow battery of claim 11, wherein the first bipolar plate and the second bipolar plate each contain a plurality of flow channels, the plurality of flow channels being configured to deliver a first electrolyte solution to the first electrode and a second electrolyte solution to the second electrode.

13. A method comprising:
providing a conductive material having a density gradient; and
forming an electrochemical cell comprising:
a first half-cell containing a first electrode;
a second half-cell containing a second electrode; and
a separator disposed between the first half-cell and the second half-cell;
wherein at least one of the first electrode and the second electrode comprises the conductive material having the density gradient, and a density of at least one of the first electrode and the second electrode increases outwardly from the separator, such that the density of the at least one of the first electrode and the second electrode increases from the separator to a bipolar plate of the flow battery.

14. The method of claim 13, further comprising:
introducing the density gradient into the conductive material by selectively depositing a conductive additive onto a first face of the conductive material.

15. The method of claim 14, wherein the conductive additive is deposited onto the first face of the conductive material by chemical vapor deposition.

16. The method of claim 14, wherein the conductive additive comprises amorphous carbon, graphite, carbon nanotubes, graphene, or any combination thereof.

17. The method of claim 14, wherein the conductive additive is deposited onto the first face of the conductive material by applying a solvent dispersion of the conductive additive onto the conductive material.

18. The method of claim 14, wherein at least one of the first electrode and the second electrode comprises a carbon cloth.

19. The method of claim 13, further comprising:
introducing the density gradient into the conductive material by selectively removing at least a portion of the conductive material from a first face of the conductive material.

20. The method of claim 19, wherein the conductive material is removed from the first face of the conductive material by a process selected from the group consisting of laser ablation, chemical etching, needling, and any combination thereof.

21. The method of claim 13, further comprising:
introducing the density gradient into the conductive material by placing at least one layer of a first conductive material upon at least one layer of a second conductive material to form a layered conductive material, the first conductive material and the second conductive material having different densities;
wherein the first conductive material is sandwiched between the separator and the second conductive material.

22. The method of claim 21, wherein the first conductive material and the second conductive material comprise carbon cloths having different densities.

23. The method of claim 13, wherein both the first electrode and the second electrode have a density gradient.

24. The method of claim 13, wherein the electrochemical cell is located within a flow battery.

25. The method of claim 13, wherein a first bipolar plate contacts the first electrode and a second bipolar plate contacts the second electrode.

26. The method of claim 25, further comprising:
connecting a plurality of the electrochemical cells in series with one another in an electrochemical stack.

27. A method comprising:
providing a flow battery having an electrochemical cell comprising:
a first half-cell containing a first electrode;
a second half-cell containing a second electrode; and
a separator disposed between the first half-cell and the second half-cell;
wherein at least one of the first electrode and the second electrode comprises a conductive material having a density gradient, and a density of at least one of the first electrode and the second electrode increases outwardly from the separator, such that the density of the at least one of the first electrode and the second electrode increases from the separator to a bipolar plate of the flow battery; and
circulating a first electrolyte solution through the first half-cell and a second electrolyte solution through the second half-cell;
wherein convective flow of at least one of the first electrolyte solution and the second electrolyte solution occurs preferentially in a low-density region of the first electrode or the second electrode proximate the separator.

28. The method of claim 27, wherein a first bipolar plate contacts the first electrode and a second bipolar plate contacts the second electrode, and the first electrolyte solution and the second electrolyte solution are circulated through a plurality of flow channels within the first bipolar plate and the second bipolar plate.

29. The method of claim 27, wherein both the first electrode and the second electrode have a density gradient.

* * * * *